United States Patent
Gysling et al.

(10) Patent No.: US 10,900,379 B2
(45) Date of Patent: Jan. 26, 2021

(54) OPTIMIZING SQUEEZE FILM DAMPER PERFORMANCE USING ENTRAINED GAS

(71) Applicant: United Technologies Corporation, Farmington, CT (US)

(72) Inventors: Daniel L. Gysling, Glastonbury, CT (US); Philip Andrew Varney, Manchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 129 days.

(21) Appl. No.: 16/270,168

(22) Filed: Feb. 7, 2019

(65) Prior Publication Data

US 2020/0256210 A1    Aug. 13, 2020

(51) Int. Cl.
*F01D 25/16* (2006.01)
*F16F 15/023* (2006.01)
*F16F 15/027* (2006.01)

(52) U.S. Cl.
CPC ........ *F01D 25/164* (2013.01); *F16F 15/0237* (2013.01); *F16F 15/0275* (2013.01); *F16F 2222/12* (2013.01); *F16F 2228/066* (2013.01); *F16F 2230/06* (2013.01); *F16F 2230/08* (2013.01)

(58) Field of Classification Search
CPC . F01D 25/164; F16F 15/0237; F16F 15/0275; F16F 9/02; F16F 222/126; F16F 2230/30; F16F 222/12; F16F 2228/066; F16F 2230/06; F16F 2230/08; F04C 2/14; F04C 2/34; F05D 2220/32; F05D 2240/54; F05D 2240/55; F05D 2240/60; F16C 2360/23

USPC ........ 188/266.3, 266.1, 266.4, 293; 384/117, 384/119, 309, 311, 312, 517
See application file for complete search history.

(56) References Cited

U.S. PATENT DOCUMENTS

| | | | |
|---|---|---|---|
| 3,574,424 A * | 4/1971 | Hagemeister | F16C 25/08 384/517 |
| 5,099,966 A | 3/1992 | Wohrl | |
| 5,215,384 A * | 6/1993 | Maier | F16C 17/03 384/117 |
| 5,360,273 A | 11/1994 | Buckmann | |
| 9,828,986 B2 | 11/2017 | Caldwell et al. | |
| 9,915,174 B1 | 3/2018 | Morris et al. | |
| 10,400,630 B2 * | 9/2019 | Ganiger | F16F 15/0237 |
| 2016/0333736 A1 | 11/2016 | Parnin | |

(Continued)

FOREIGN PATENT DOCUMENTS

| EP | 3620608 A1 * | 3/2020 |
|---|---|---|
| WO | 8604126 | 7/1986 |

OTHER PUBLICATIONS

European Search Report for European Application No. 20155716.2 dated Jul. 8, 2020.

*Primary Examiner* — Pamela Rodriguez
(74) *Attorney, Agent, or Firm* — Carlson, Gaskey & Olds, P.C.

(57) ABSTRACT

An actively controlled squeeze film damper system comprises a housing defining an annulus receiving a damping fluid during operation, a lubricant source supplying damping fluid to the annulus, and a sensor assembly for measuring a parameter indicative of a compressibility of the damping fluid. A control device adjusts the compressibility of the damping fluid within a predefined range.

18 Claims, 5 Drawing Sheets

(56) References Cited

U.S. PATENT DOCUMENTS

2017/0335767 A1\* 11/2017 Gysling .................. F02K 3/025
2019/0071997 A1\* 3/2019 Jonsson .................... F02C 7/06
2019/0234459 A1\* 8/2019 Taguchi ................ F16C 27/045
2020/0056677 A1\* 2/2020 Schmidt .................... F01D 5/10
2020/0191016 A1\* 6/2020 Ertas .................. F16C 32/0677

\* cited by examiner

OPTIMIZING SQUEEZE FILM DAMPER PERFORMANCE USING ENTRAINED GAS

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. Bearings are provided to support rotation of each of the structures of the gas turbine engine. Dampers may also be provided to accommodate rotor dynamic properties.

A squeeze film damper utilizes a film of working fluid to create pressure forces between a support structure and a rotating element. Lubricant is utilized as the working fluid and cycled through the damper during operation. Air and other entrained gases within the lubricant can reduce effectiveness of the damper and therefore devices to remove entrained gases from the working fluid are provided. Even with such devices, the effectiveness of the damper may not be consistent nor accommodate current operating conditions.

Turbine engine manufacturers continue to seek further improvements to engine performance including improvements to thermal, transfer and propulsive efficiencies.

SUMMARY

An actively controlled squeeze film damper system according to an exemplary embodiment of this disclosure comprises, among other possible things, a housing defining an annulus receiving a damping fluid during operation, a lubricant source supplying damping fluid to the annulus, a sensor assembly for measuring a parameter indicative of a compressibility of the damping fluid, and a control device for adjusting the compressibility of the damping fluid within a predefined range.

In a further embodiment of the foregoing actively controlled squeeze film damper system, the sensor assembly measures a sound speed of the damping fluid downstream of the lubricant source and the control device adjusts the sound speed of the damping fluid.

In a further embodiment of any of the foregoing actively controlled squeeze film damper systems, a speed sensor measures a rotational speed of a rotating member within the annulus.

In a further embodiment of any of the foregoing actively controlled squeeze film damper systems, the predefined range comprises a range of Mach numbers of the squeeze film damper.

In a further embodiment of any of the foregoing actively controlled squeeze film damper systems, the range of the Mach number of the squeeze film damper is between Mach 0.005 and Mach 5.0.

In a further embodiment of any of the foregoing actively controlled squeeze film damper systems, the control device comprises a control valve configured to introduce a gas into the damping fluid.

In a further embodiment of any of the foregoing actively controlled squeeze film damper systems, the control device comprises a separator for separating gases from the damping fluid that is configured to adjust the sound speed of the damping fluid by adjusting an amount of gas removed from the damping fluid by the separator.

In a further embodiment of any of the foregoing actively controlled squeeze film damper systems, the control device comprises a lubricant pump that adjusts a pressure of the damping fluid to adjust the sound speed of the damping fluid.

In a further embodiment of any of the foregoing actively controlled squeeze film damper systems, the inner housing comprises a portion of a bearing assembly supporting rotation of the rotating element.

A method of actively controlling squeeze film damper performance according to an exemplary embodiment of this disclosure, comprises, among other possible things, measuring a sound speed of a damping fluid prior to entering a damper chamber, and determining a Mach number of the damping fluid based on the measured sound speed and a rotational speed of a rotating element. Properties of the damping fluid are adjusted to provide the sound speed of the damping fluid corresponding with a desired damping characteristic.

In a further embodiment of the foregoing method of actively controlling a squeeze film damper performance, the sound speed of the damping fluid is adjusted by injecting gas into the damping fluid prior to entering the film damper.

In a further embodiment of any of the foregoing methods of actively controlling a squeeze film damper performance, the sound speed of the damping fluid is adjusted by varying an amount of entrained gas removed from the damping fluid with a separator.

In a further embodiment of any of the foregoing methods of actively controlling a squeeze film damper performance, the sound speed of the damping fluid is adjusted by varying a pressure of the damping fluid supplied to the damping chamber Another method of actively controlling squeeze film damper performance according to an exemplary embodiment of this disclosure comprises, among other possible things, supporting rotation of a rotor system with a damper fluid within a damper chamber, and measuring a parameter of a rotor system indicative of a dampening characteristic of the damper fluid. A sound speed of the damping fluid is modified based on the measured parameter to adjust the measured parameter to be within a predefined range.

In a further embodiment of the foregoing method of actively controlling a squeeze film damper performance, the measured parameter comprises a vibration of a housing supporting the rotor system measured with one of a vibration sensor or a proximity probe In a further embodiment of any of the foregoing methods of actively controlling a squeeze film damper performance, the sound speed of the damping fluid is adjusted by injecting gas with a control valve into the damping fluid prior to entering the damper chamber.

In a further embodiment of any of the foregoing methods of actively controlling a squeeze film damper performance, the sound speed of the damping fluid is adjusted by varying an amount of entrained air removed from the damping fluid prior to entering the damping chamber.

In a further embodiment of any of the foregoing methods of actively controlling a squeeze film damper performance, the sound speed of the damping fluid is adjusted by adjusting a pressure of the damping fluid within the damping chamber.

In a further embodiment of any of the foregoing methods of actively controlling a squeeze film damper performance, the sound speed of the damping fluid is continually modified during operation responsive to continual measurements of the parameter of the rotor system indicative of dampening characteristics.

In a further embodiment of any of the foregoing methods of actively controlling a squeeze film damper performance, the sound speed of the dampening fluid is modified to a predefined value responsive to detecting an operating condition of the rotor system that corresponds to the predefined value.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
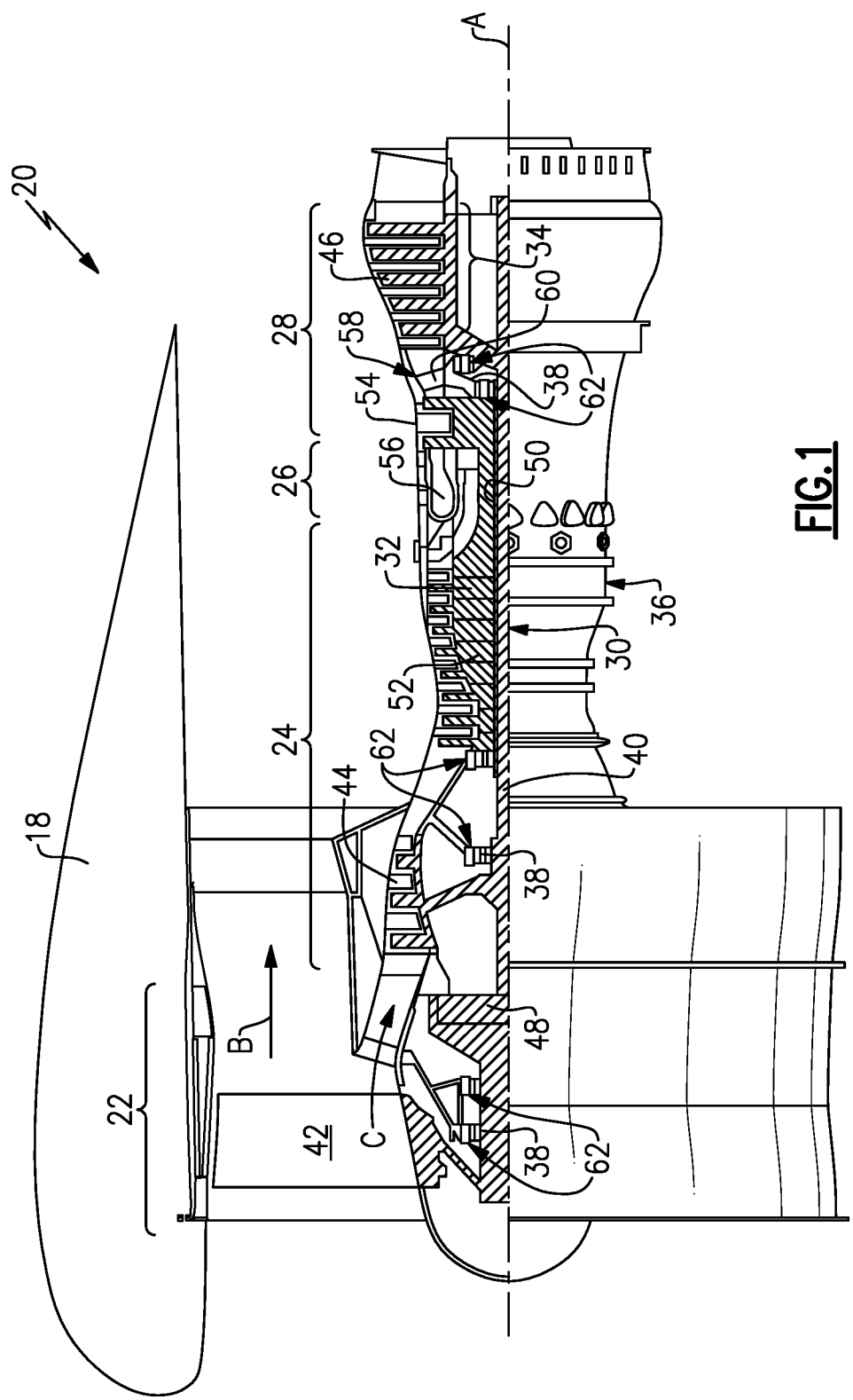
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The rotating elements supported by the bearing systems 38 can be subject to rotor dynamics that can generate vibrations that can impair engine operation. The disclosed engine 20 includes an active squeeze film damper system 62 with the bearing systems to damp vibration and other undesired rotor dynamics. The disclosed active squeeze film damper systems 62 include features that adjust damping characteristics in response to engine operation and measured damper fluid characteristics.

Figure 2:
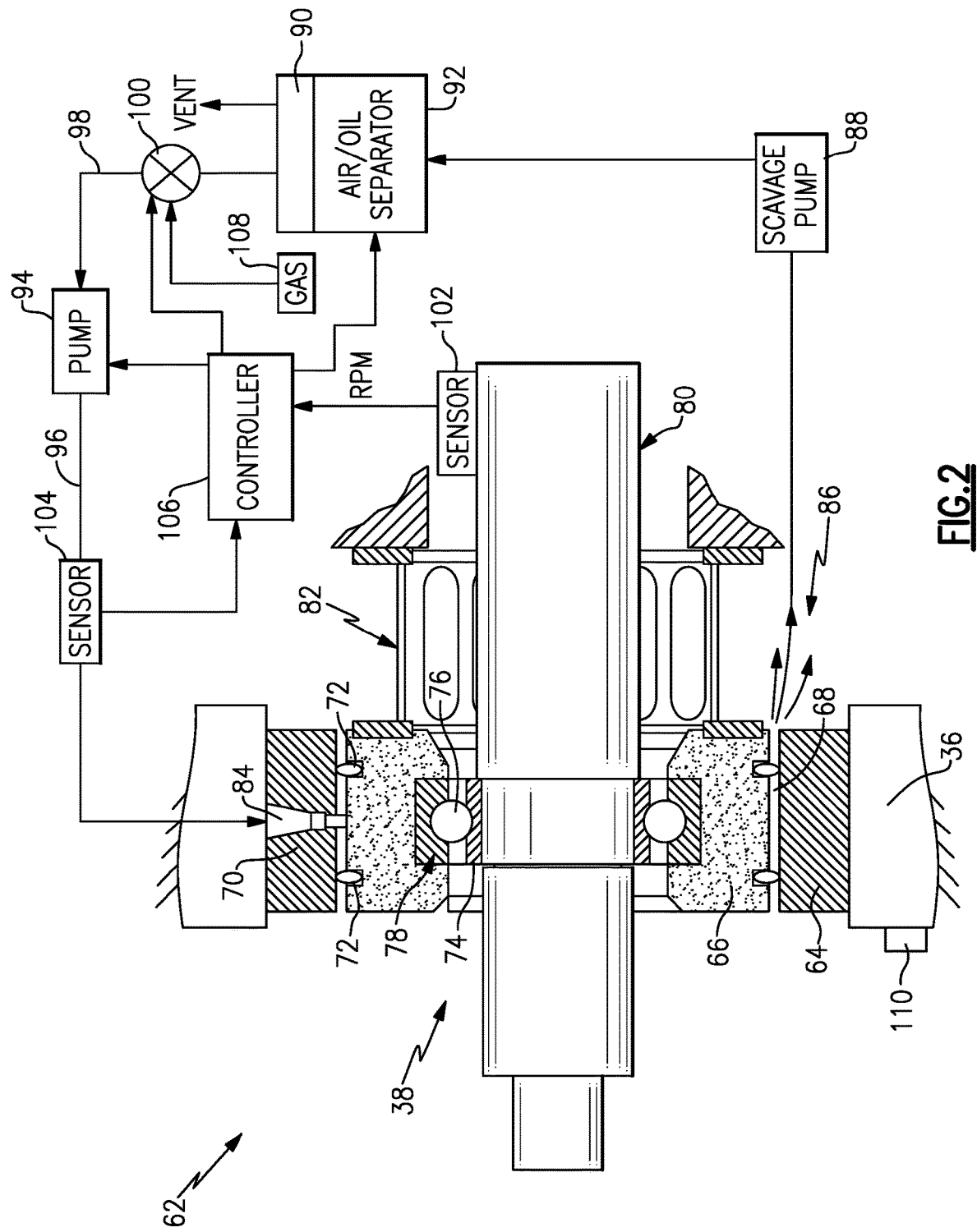
FIG. 2 is a schematic view of an example actively controlled squeeze film damper system embodiment.

Referring to FIG. 2, the example active squeeze film damper system 62 is schematically shown along with one of the bearing systems 38 and includes a damper chamber in the form of an annulus 68 defined between an outer housing 64 and an inner housing 66. The annulus 68 is bordered on axial sides by seals 72. The outer housing 64 is supported on a portion of the engine fixed static structure 36 and includes a supply passage 70 to the annulus 68. The inner housing 66 is at least partially held axially in place by a support 82. A bearing system 38 includes an outer race 78 that is disposed on the inner hosing 66. An inner bearing race 74 is attached to a rotating element. In this example, the rotating element is a shaft 80. Rolling element 76 is disposed between the inner and outer bearing races 74, 78. The damper system 62 is contained within a bearing compartment that is filled with air at a set pressure. Damper fluid 84 is supplied to the annulus 68 at a pressure in excess of the air pressure within the bearing compartment. Accordingly, damper fluid 84 flows past the seals 72 into the bearing compartment as indicated at 86. The damper fluid 84 is then gathered and moved to a lubricant reservoir 90 by scavenger pump 88. The damper fluid 84 is typically a lubricant of the same type as is used for lubrication of the bearing system 38. The term damper fluid 84 and lubricant may be utilized throughout this disclosure to refer the medium supplied to the annulus 68.

Air mixes with the lubricant as it is exhausted from the annulus 68 and communicated to a separator 92. The separator 92 removes air and other entrained gases from the lubricant. The lubricant is then stored in a reservoir 90. The entrained air and gases within the damper fluid 84 can alter the desired damping capability of the system. Gases may further leave the lubricant through a vent while within the reservoir. Accordingly, the separator 92 and the reservoir operate to separate air from the damper fluid 84 prior to the damper fluid being recirculated to the bearing and damping systems 38, 62.

Figure 3:
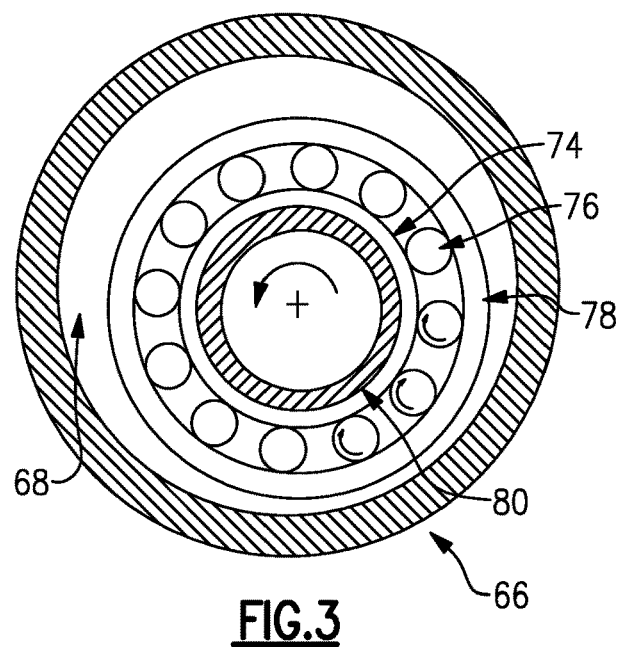
FIG. 3 is a schematic cross-section of an example damper chamber.
Figure 4:
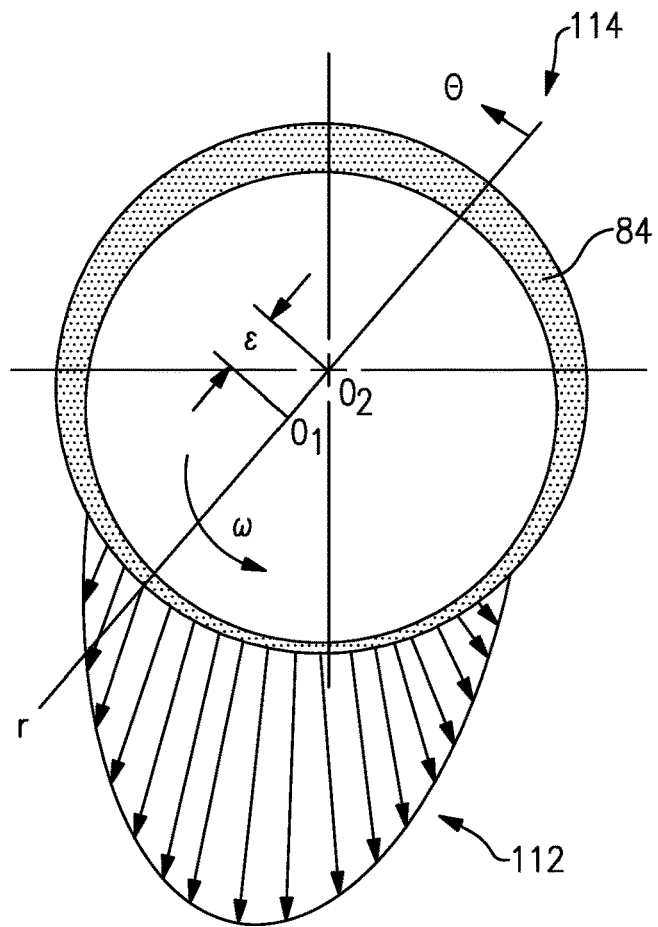
FIG. 4 is a schematic cross-section of a pressure field within a damper chamber.

Referring to FIGS. 3 and 4 with continued reference to FIG. 2, the squeeze film damper system 62 generates a force on the shaft 80 by squeezing a film of the damper fluid 84 between two circular cross section regions defined by the outer housing 64 and the inner housing 66. Squeeze film damper provide damping and stiffness of rotor dynamics. the damping and stiffness provided by the squeeze film damper is typically predicted as an incompressible fluid dynamic model to solve for the pressure field generated with the squeeze film damper as a result of rotor whirl. The outer race 78 does not spin, but whirls at a frequency ω rad/sec, the amplitude of which is defined as the eccentricity ε.

The outer housing 64 is fixed to the engine static structure 36 and the inner housing 66 whirls with the shaft 80. The whirl of the inner housing 66 is not a rotation but instead a translation caused by whirl of the rotor with respect to the support structure which causes change in the annular gap around the circumference the squeeze film damper, generating pressure field in the damping fluid in response to this motion.

A pressure field 112, shown schematically in FIG. 4 is developed as the shaft 80 whirls relative to the axis of rotation. Forces acting on the shaft 80 can be resolved into components that align with an eccentricity and components θ perpendicular to the eccentricity indicated at 114. Resolving the forces acting within the annulus enables the forces to be expressed in terms of a squeeze film damper generated stiffness and a damping constant. The pressure field 112 is a region of positive pressure with respect to the circumferential mean of pressure within the annulus 68. There is also a corresponding region in which the pressure is reduced to below the mean pressure.

The damping and stiffness provided by the squeeze film damper is often predicted using an incompressible fluid dynamic model to solve for the pressure field generated with the squeeze film damper as a result of rotor whirl, the amplitude of which is defined as the eccentricity, e.

Stiffness coefficient, K, and a damping coefficient, B, are related to the radial and tangential forces and typically defined as follows:

$$K \equiv \frac{F_r}{e}$$

$$B \equiv \frac{F_t}{e\Omega}$$

Where $\Omega$ is the shaft angular velocity.

The damper fluid 84 within the squeeze film damper is treated as incompressible. However, this assumption can lead to misleading predictions for the behavior of squeeze film dampers when the fluid film is sufficiently compressible, such as for example when sufficient amount of entrained air is present. The effectiveness of the damper system 62 is impacted by the amount of entrained gases contained within the damping fluid 84. Entrained air and/or gas may originate from mixing of the lubricant with air within the lubrication system. Entrained air may also be introduced into the annulus 68 when pressure within the squeeze film damper falls below the air pressure within the bearing compartment. 68. Accordingly, operation of the damper system 62 may vary depending on the amount of entrained gases within the damper fluid.

The amount of entrained gases within a fluid can result in changes in a speed at which sound propagates through that fluid. A relationship between entrained gases and the speed of sound through a fluid is understood by a Wood's equation provided below.

$$\frac{1}{\rho_{mix} a_{mix}^2} = \frac{GVF}{\rho_{gas} a_{gas}^2} + \frac{1-GVF}{\rho_{liq} a_{liq}^2}$$

Where "a" is the sound speed, ρ is density, and GVF is the gas void fraction. The entrained air increases compressibility of the damper fluid 84. One measure of the effect of this added compressibility on the behavior of the squeeze film damper can be defined as the Mach number of the squeeze film damper. This Mach number is defined as the ratio of the speed at which the minimum gap rotates around the annulus 68 to the speed of sound of the damper fluid 84 at the supply pressure.

$$M_{SFD} \equiv \frac{R\Omega}{a_{mix}}$$

Where R is the radius of the squeeze film and $a_{mix}$ is the sound speed of the damper fluid entering the annulus 68. The Mach number of the squeeze film damper (Msfd) effects the damping and stiffness performance of the damping system.

Figure 5:
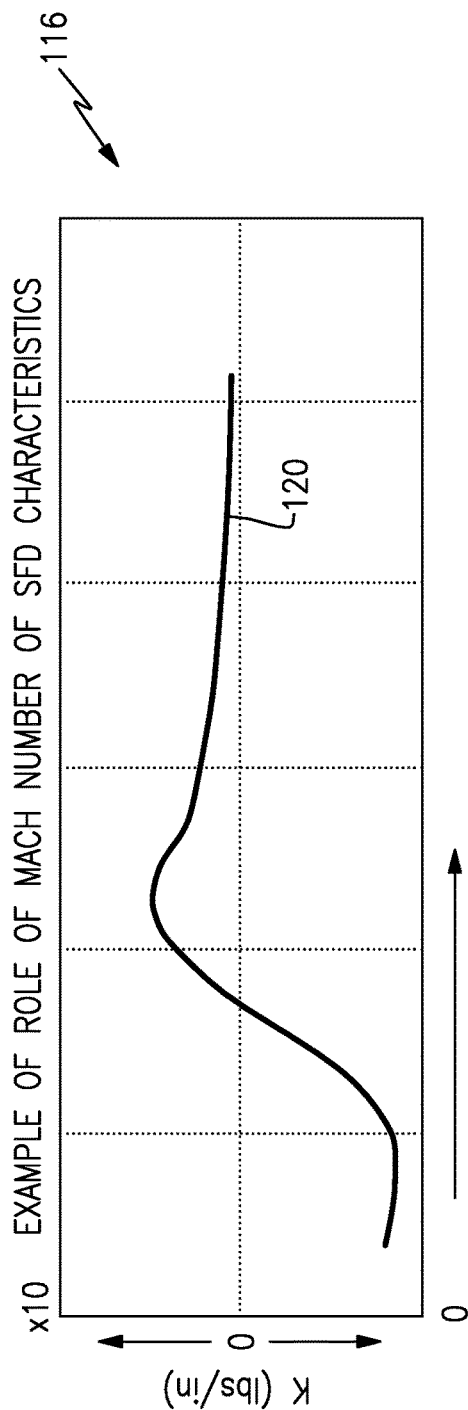
FIG. 5 is a graph illustrating a relationship between a Mach number and damper stiffness.
Figure 6:
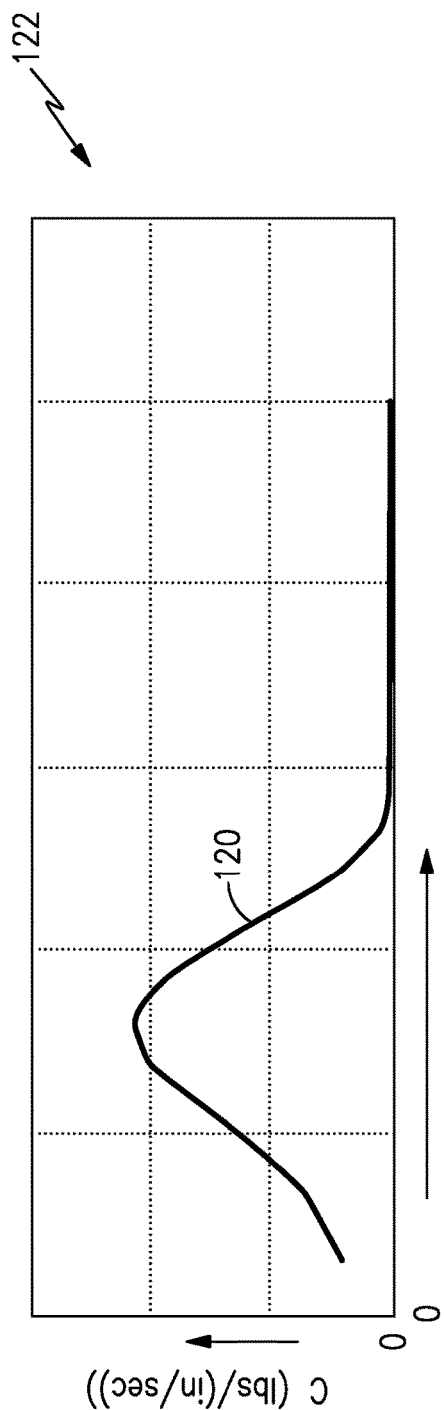
FIG. 6 is a graph illustrating a relationship between Mach number and a damper coefficient.

Referring to FIGS. 5 and 6, a graph 116 illustrates a relationship between a stiffness (K) and the damper fluid Msfd number for a compressible fluid 120. Graph 122 illustrates a relationship between a damping coefficient (C) and the damper fluid Msfd number for a c. Both graphs 116 and 122 show a relationship for compressible fluids 120. As is shown in the graphs 116 and 122, the Msfd number has a predictable effect on changes in the stiffness and damping coefficients for a compressible fluid.

Accordingly, control of the Msfd of the damper fluid 84 enables control and adjustment of a damper performance as a function of the compressibility of the damper fluid 84. The compressibility of the damper fluid 84 may be varied by controlling the amount of entrained gases present. Rotor whirl, critical speeds, amplification factors associated with critical speeds, and vibrations transmitted to the static structures are all influenced by the stiffness and damping characteristics of damper system 62. The disclosed system 62 includes features for measuring and controlling damper performance by adjusting the amount of entrained gases within the damper fluid 84.

Referring to FIGS. 2-4, the example damper system 62 measures characteristics of the damper fluid indicative of compressibility and adjusts the compressibility of the damper fluid 84 to provide a desired stiffness and damper operation. The compressibility of the damper fluid 84 may be monitored by measuring the speed of sound, entrained air content, or any other parameter indicative of the fluid compressibility.

The example damper system 62 includes features to measure and control the compressibility of the damper fluid 84. Damper fluid 84 is supplied at elevated pressure to the annulus 68 through the passage 96 downstream from a lubricant pump 94. The speed at which sound propagates in the damper fluid 84 for wavelengths that are long compared to the diameter of the shaft 80 is measured by a sensor 104. The sensor 104 is provided after the pump 94 and before the annulus 68. The measured sound speed provided to a controller 106. The controller 106 also receives information indicative of a rotational speed of the shaft 80 from a speed sensor 102. The speed of the shaft 80 and the measured speed of sound used to calculate an Msfd associated with the damper fluid. The sensor 104 and the speed sensor 102 may be of any known configuration capable of providing continuous information to the controller 106 indicative of sound speed and speed of the shaft. Moreover, other measurement means and determinations for the desired information could also be utilized and are within the contemplation of this disclosure.

The determined Msfd is then compared to a predefined range of Msfd selected to optimize damper performance. If the measured Msfd is within the predefined range, the system continues operation without changing the damper fluid 84. However, if the Msfd is not within the predefined range, the compressibility of the damper fluid 84 is changed. In one disclosed embodiment, the Msfd value is adjusted to between 0 and 10. In another disclosed embodiment, the Msfd value is adjusted to be between 0.005 and 5.0. In yet another disclosed embodiment, the Msfd value is adjusted to between 0.5 and 1.0. It should be appreciated that although example ranges are disclosed by way of example, other Msfd ranges could be used and are within the contemplation of this disclosure.

In this example, a control valve 100 is provided upstream of the pump 94 in a passage 98. The control valve 100 is in communication with the controller 106 and injecting air or another gas indicated at 108 into the damper fluid to modify the compressibility of the damper fluid 84.

The disclosed system 62 may also modify the compressibility of the damper fluid 84 by varying operation of the separator 92. The separator 92 separates air and other entrained gases from lubricant provided from the reservoir. The controller 106 can vary operation of the separator 92 to remove more or less air from the lubricant to modify the compressibility of the damper fluid 84.

Additionally, the disclosed system 62 may also vary operation of the pump 94 to change the supply pressure of the damper fluid 84 within the annulus. Variations in pressure are known to change the sound speed of gas/liquid mixtures such as the damper fluid 84 and provides another means of adjusting damper operation. It should be understood that although examples of devices for controlling the compressibility of the damper fluid are disclosed, other means of actively altering the compressibility of the damper fluid 84 are within the contemplation of this disclosure.

Figure 7:
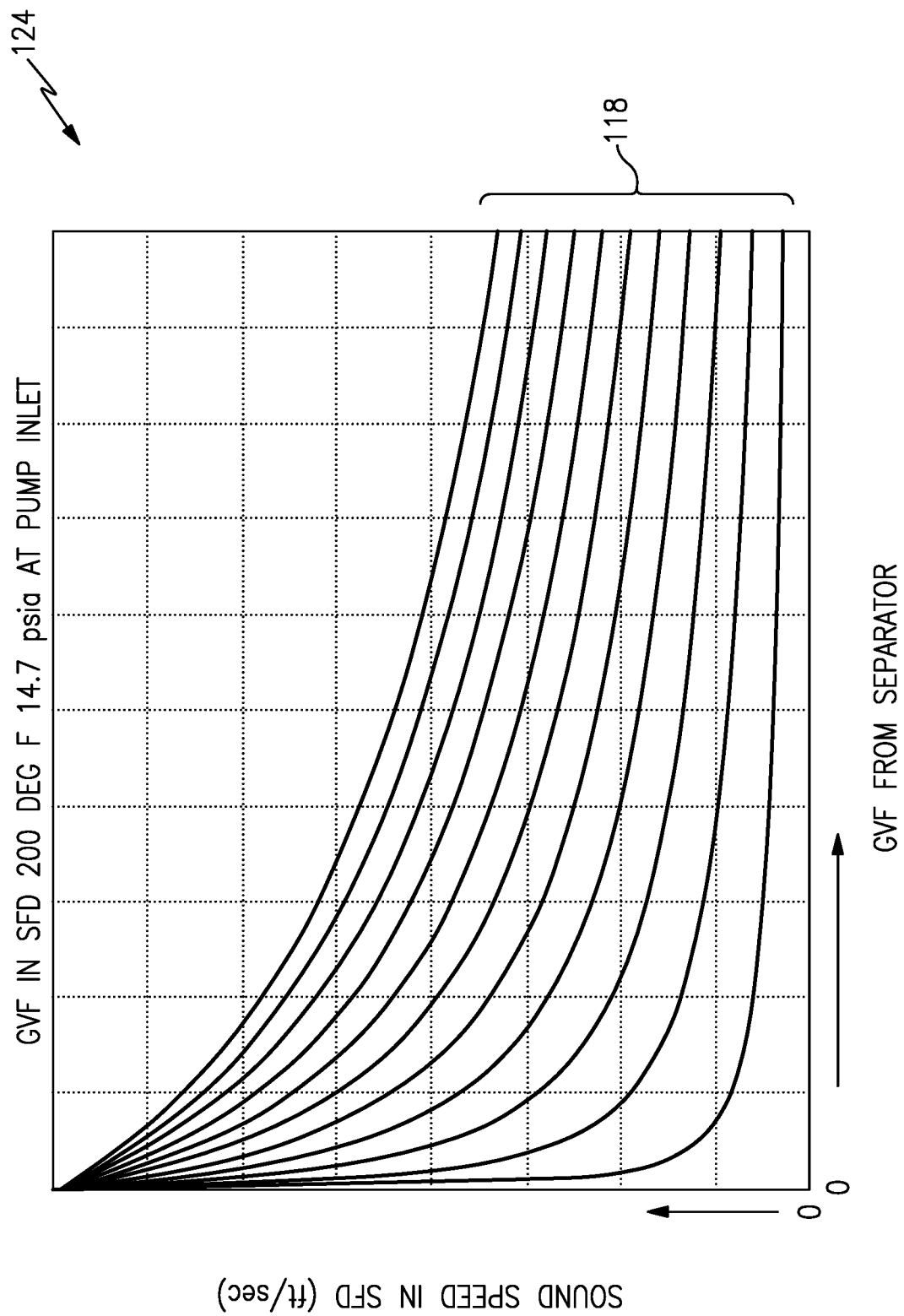
FIG. 7 is a graph illustrating relationships between a speed of sound and gas void fraction of a damper fluid.

Referring to FIG. 7, with continued reference to FIGS. 2-4, a graph 124 illustrates various relationships between a gas void fraction (GVF) and a sound speed of fluid for different pressures. Each line represents 118 the relationship between sound speed and the GVF at a reference condition at various pressures with pressures increasing in a direction away from the x-axis. The relationship is utilized to determine the amount of GVF required to provide the desired sound speed within the damper fluid 84. The sound speed utilized to determine the desired Msfd that corresponds with the desired damper performance.

The example system can operate as a closed loop system where measurements provided by the sensors 104, 102 are continually monitored and the GVF of the damper fluid 84 is continually adjusted with the control valve 100. The example system 62 may also utilize information from a sensor 110 that obtains information indicative of a vibration of the static structure 36 proximate the damper system 62. The GVF of the damper fluid 84 could thereby be altered until vibrations detected by the sensor 110 are within a predefined range.

Additionally, the example system 62 may operate as an open loop system where engine or shaft operating conditions prompt modification of the damper fluid 84. In one example embodiment, the GVF of the damper fluid 84 is adjusted in response to the shaft 80 operating within a predefined range of speeds. The controller 106 includes a listing of GVF damper fluid settings that correspond with engine operating conditions. Upon reaching the defined operating condition, the controller 106 prompts adjustment of the damper fluid 84 by injecting more or less air with the control valve 100 until the corresponding GVF level is obtained. As appreciated, the GVF level corresponds to the Msfd of the damper fluid 84 and thereby provides the desired stiffness and dampening coefficients desired to optimize engine operation.

Additionally, the example system 62 may vary entrained air levels based on a relationship between desired rotor dynamic characteristics and one or more parameters known to influence compressibility of the damper fluid supplied to one or more squeeze film dampers.

Accordingly, the example system 62 utilizes information indicative of a compressibility of the damper fluid to continually adjust and modify damper characteristics to accommodate and rotor and shaft dynamics.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An actively controlled squeeze film damper system comprising:
   a housing defining an annulus receiving a damping fluid during operation;
   a lubricant source supplying damping fluid to the annulus;
   a sensor assembly for measuring a parameter indicative of a compressibility of the damping fluid, wherein the sensor assembly measures a sound speed of the damping fluid downstream of the lubricant source; and
   a control device for adjusting the compressibility of the damping fluid by adjusting the sound speed of the damping fluid within a predefined range.

2. The actively controlled squeeze film damper system as recited in claim 1, including a speed sensor measuring a rotational speed of a rotating member within the annulus.

3. The actively controlled squeeze film damper system as recited in claim 2, wherein the predefined range comprises a range of Mach numbers of the squeeze film damper.

4. The actively controlled squeeze film damper system as recited in claim 3, wherein the range of the Mach number of the squeeze film damper is between Mach 0.005 and Mach 5.0.

5. The actively controlled squeeze film damper system as recited in claim 1, wherein the control device comprises a control valve configured to introduce a gas into the damping fluid.

6. The actively controlled squeeze film damper system as recited in claim 1, wherein the control device comprises a separator for separating gases from the damping fluid that is configured to adjust the sound speed of the damping fluid by adjusting an amount of gas removed from the damping fluid by the separator.

7. The actively controlled squeeze film damper system as recited in claim 1, wherein the control device comprises a lubricant pump that adjusts a pressure of the damping fluid to adjust the sound speed of the damping fluid.

8. The actively controlled squeeze film damper system as recited in claim 1, wherein the housing comprises a portion of a bearing assembly supporting rotation of a rotating member.

9. A method of actively controlling squeeze film damper performance comprising:
   measuring a sound speed of a damping fluid prior to entering a damper chamber;
   determining a Mach number of the damping fluid based on the measured sound speed and a rotational speed of a rotating element; and
   adjusting properties of the damping fluid to provide the sound speed of the damping fluid corresponding with a desired damping characteristic.

10. The method as recited in claim 9, wherein the sound speed of the damping fluid is adjusted by injecting gas into the damping fluid prior to entering the film damper.

11. The method as recited in claim 9, wherein the sound speed of the damping fluid is adjusted by varying an amount of entrained gas removed from the damping fluid with a separator.

12. The method as recited in claim 9, wherein the sound speed of the damping fluid is adjusted by varying a pressure of the damping fluid supplied to the damping chamber.

13. A method of actively controlling squeeze film damper performance comprising:
   supporting rotation of a rotor system with a damper fluid within a damper chamber;
   measuring a parameter of the rotor system indicative of a dampening characteristic of the damper fluid; and
   modifying a sound speed of the damping fluid based on the measured parameter to adjust the measured parameter to be within a predefined range, wherein the sound speed of the damping fluid is adjusted by varying an amount of entrained air removed from the damping fluid prior to entering the damping chamber.

14. The method as recited in claim 13, wherein the measured parameter comprises a vibration of a housing supporting the rotor system measured with one of a vibration sensor or a proximity probe.

15. The method as recited in claim 14, wherein the sound speed of the damper fluid is adjusted by injecting gas with a control valve into the damper fluid prior to entering the damper chamber.

16. The method as recited in claim 14, wherein the sound speed of the damper fluid is adjusted by adjusting a pressure of the damper fluid within the damping chamber.

17. The method as recited in claim 13, wherein the sound speed of the damper fluid is continually modified during operation responsive to continual measurements of the parameter of the rotor system indicative of dampening characteristics.

18. The method as recited in claim 13, including modifying the sound speed of the damper fluid to a predefined value responsive to detecting an operating condition of the rotor system that corresponds to the predefined value.

* * * * *